April 12, 1966     B. KLIMAK ETAL     3,245,428
FLEXIBLE SEAL FOR USE IN A GLADHAND ASSEMBLY
Filed Nov. 8, 1963
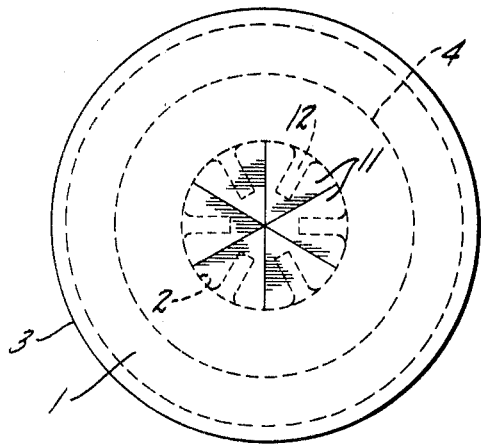
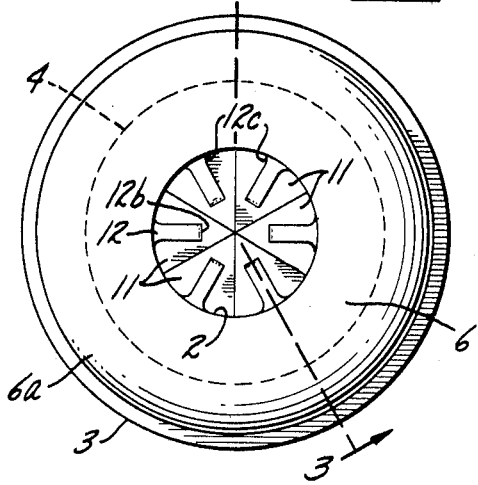
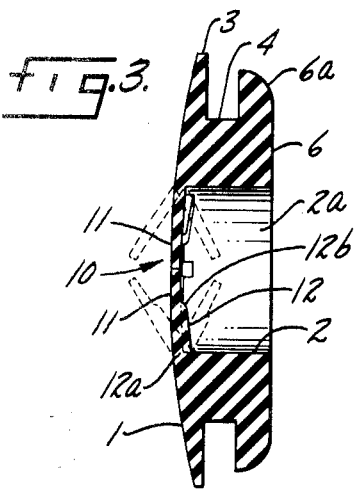
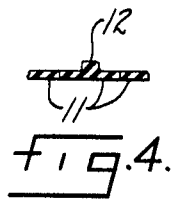
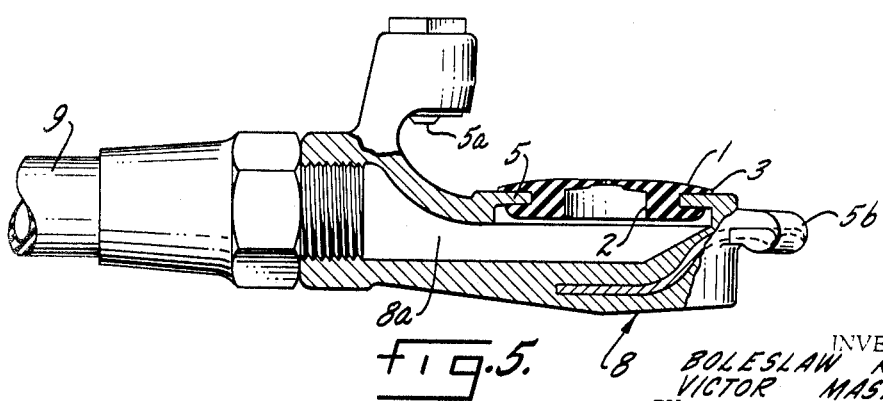
INVENTORS.
BOLESLAW KLIMAK
VICTOR MASTIS
BY Parker & Carter
Attorneys.

United States Patent Office 3,245,428
Patented Apr. 12, 1966

3,245,428
FLEXIBLE SEAL FOR USE IN A GLADHAND ASSEMBLY
Boleslaw Klimak, Chicago, and Victor Mastis, Cicero, Ill., assignors, by mesne assignments, to Berg Mfg. & Sales Co., Des Plaines, Ill., a corporation of Illinois
Filed Nov. 8, 1963, Ser. No. 322,344
2 Claims. (Cl. 137—493)

This invention relates to gladhand structures and has particular relation to a gladhand seal and a gladhand assembly including a seal element effective when the assembly is both at rest and in use.

The connector fittings for the ends of air hoses employed on truck-tractors and trailers, for example, are known as "gladhands." The name has apparently derived from the fact that the individual fittings, which are normally identical, give the appearance, when connected together, of a pair of interlocked human hands. Each individual fitting has a bore or passage open to atmosphere at one end and communicating with the hose to which it is attached at the other. In the open end of said bore of each fitting is a flexible grommet or seal. Each seal has a central bore, coaxial with the bore in which the seal is fitted, and an outer surface extending beyond the bore for mating with its counterpart seal when the gladhand fittings are assembled.

The fittings are assembled by placing these outer seal surfaces in contact with each other and twisting the fittings into alignment, the twisting action causing a movement of the fittings toward each other, axially of the bores, and a resulting compression of the seals.

In the past a serious problem has been presented by the fact that the gladhands are open to atmosphere when disconnected. For example, when truck-trailers are shipped on railroad cars the open bore in the gladhand and seal permit the ingress of dust, cinders, sand and the like. Insects have built nests in the gladhands of tractors and trailers which have been separated for even a short time in storage, or while loading and off-loading the trailers. Driver-maintenance has been required in an effort to clean out the gladhands prior to their connection. If, as often happens, the driver connects the gladhands without such cleaning action, deleterious materials in the gladhand of either the tractor or trailer are carried into the air brake system under pressure when the compressor carried by the tractor delivers air pressure to the brake system of the trailer, resulting in injury to sensitive diaphragms, valve clearances and piston seals in the brake system and requiring disassembly of elements of, or the entire, system to locate and remove such materials. Efforts to solve the problem by providing a spring-actuating closure plate, which must be pulled back against such spring action to permit connection of the gladhands, have proved unsatisfactory in that such plates, in addition to adding weight and cost, tend to break off and become bent in use. Accordingly, it is one purpose of the invention to provide an automatic, human error-proof, yet economical means of sealing the glandhand and hose against ingress of undesirable materials when the gladhands are separated.

Another purpose is to provide a seal means for gladhands which shall be free of driver maintenance or concern.

Another purpose is to provide a gladhand seal having integral seal means for sealing the bore therein when the gladhands are disconnected.

Another purpose is to provide a gladhand seal having means for sealing the bore therein which shall be automatically opened upon passage of air pressure therethrough and automatically closed when air pressure is absent therein.

Another purpose is to provide a seal having integral valve means effective to open automatically upon passage of air pressure through said seal and having means returning said valve means to closed position in the absence of air pressure therethrough.

Another purpose is to provide a gladhand seal and valve closure means for said seal which shall be economical in manufacture and of maximum simplicity in use.

Another purpose is to provide a gladhand seal and closure means therefor which shall be automatically effective and free of the affect of human error in use.

Other purposes will appear from time to time during the course of the specification and claims.

The invention is illustrated more or less diagrammatically in the accompanying drawing wherein:

FIGURE 1 is a top plan view of the gladhand seal of the invention;

FIGURE 2 is a bottom plan view of the gladhand seal of the invention;

FIGURE 3 is a view taken on the line 3—3 of FIGURE 2;

FIGURE 4 is a detailed view in cross section; and

FIGURE 5 is a side view in cross section of a gladhand assembly of the invention.

Like parts are indicated by like numerals throughout the specification and drawing.

Referring now to the drawings, and particularly to FIGURES 1 and 3, the gladhand seal of the invention is generally circular in planar configuration, having an upper or outer surface 1 which, as may be best seen in FIGURES 3 and 5, is generally frusto-conical, lying in a generally outwardly, downwardly inclined or curved plane from the circular edge of a central bore 2 in the seal to a peripheral edge 3.

The circumferential outer surface of the gladhand seal of the invention has an annular groove 4 positioned for reception of a mating annular flange in the gladhand body 8 with which the seal is employed. Referring for the moment of FIGURES 5, for example, such a flange is illustrated at 5. An annular surface 6 surrounds the end of bore 2 opposite that surrounded by surface 1. A curved surface 6a is shown as joining he annular surface 6 with one outer edge of the groove 4. It will be understood, however, that the particular detailed conformation of the surfaces 6, 6a, groove 4 and flange 5, as well as that of surface 1, may be varied without departing from the nature and scope of the invention. Indicated at 5a, 5b are locking elements formed on the body 8 for mating with corresponding elements on an identical body 8 when two such gladhand assemblies are connected.

The bore 2 has an inner open end 2A communicating with one end of a passage 8a in the gladhand structure. As will be observed in FIGURE 5, the passage 8a communicates at its opposite end with the air hose end portion 9 to which the gladhand is secured.

Located in the opposite or outer end of the bore 2 is a closure valve assembly indicated generally by the numeral 10. The closure valve 10 comprises a plurality of generally pie-cut-shaped flapper vane portions 11. It has been found convenient, for example, to provide six such vanes or membranes which, together, substantially completely fill and close the bore 2 against passage thereinto of undesirable materials when the membranes are closed, it being understood that each of the elements 11 has its side edges in contact with or immediately adjacent the opposed side edges of a pair of adjacent elements 11. It has been found convenient to form the closure valve integrally with the seal as a continuous circular membrane and thereafter to form three diametrical cuts therein to form the six individual vanes 11, the cuts being made by a very thin knife edge. The elements 11 are formed of the same flexible material of which the glandhand seal is formed but are of relatively thin cross-sectional dimension, as may be best seen in FIGURE 3, and are therefore free, as shown in dotted lines in FIGURE 3, to flex inwardly of bore 2 and outwardly thereof beyond surface 1 in response to the passage of fluid pressure through the bore 2 in either axial direction. Thus identical seal members are usable in each of any pair of gladhand assemblies.

Formed integrally with the gladhand and with each of the elements 11 is a positioning rib 12. The ribs 12 may be best seen in FIGURES 2 and 3. Each of the ribs 12 extends from the surface of bore 2 in a plane inclined toward its associated element 11 and terminates inwardly of the outer pointed end of its associated element 11. The Thus, as may be best seen in FIGURE 3, each rib 12 has a relatively thick base 12a and extends therefrom to a generally reduced or feathered outer edge 12b. As may be best seen in FIGURE 2, the side edges of each rib 12 are parallel from the outer edge 12b and terminate in outwardly flared curved segments 12c at their point of juncture with the surface of bore 2.

The use and operation of the invention are as follows:

With the seal of the invention installed in a gladhand structure, as illustrated in FIG. 5, the valve 10 is automatically maintained in closed position. The ribs 12 are effective to insure the return of the membranes 11 into sealing contact or position in relation to each other, to close the bore 2 in the gladhand seal whenever air pressure is absent in the bore 2. Thus, upon separation, for any reason, of the gladhand assemblies of a tractor-trailer combination, for example, the passage 8a and hose 9 will be automatically sealed against ingress of undesirable and deleterious materials. No action whatever is required on the part of the vehicle operator to insure such closure and automatic sealing.

When the gladhands are connected the opposed inner circular edges of the surfaces 1 on the gladhand seals of each gladhand assembly are first placed in contact. As the gladhand assemblies are rotated to lock the same together the surfaces 1 are compressed and are placed in contact in their entireties. Since the elements 11 extend in a single flat plane, perpendicular to the axis of bore 2, the elements 11 are not affected by the sealing action and compression together of the surfaces 1 of opposed gladhand seals. With the gladhand assemblies thus connected, movement of air pressure through the aligned bores 2 of the gladhand seals is effective to open the valve formed by the individual valve segments 11. With the air pressure moving through the aligned bores 2, it will be understood that the elements 11 of one gladhand seal are deflected inwardly of its associated bore 2 and the elements 11 of the opposed gladhand seal are deflected in the same direction, i.e. outwardly of its associated bore and into the bore 2 of the opposed seal in contact with the opposed elements 11. The moment fluid pressure is relieved or released from the bores 2, the rib 12 of each closure segment 11 is effective to snap or immediately return the segment 11 into sealing position across its associated bore 2. Because of its configuration the rib 12 insures such return whether the rib 11 has been deflected by the air pressure inwardly or outwardly of its associated bore 2. While the rib 11 tends to return to the sealing position shown in FIGURE 3 of its own volition, the presence of ribs 12 insures such return. Since the ribs 12 terminate short of the inner pointed ends of each element 11, it will be observed that provision exists for progressive applications of various fluid pressures through the bores 2, the greater pressures causing a greater deflection of the elements 11.

Thus the operator, when he turns off the fluid pressure through the bores 2 of a connected pair of gladhand assemblies, is assured of an automatic sealing of the gladhand seals in the connected assemblies at that time. The seals are thus closed when the gladhand assemblies are disconnected. If the gladhand assemblies be disconnected while fluid pressure exists through the bores 2, the seal on the gladhand secured to the hose of the trailer will immediately be closed by its elements 11 since pressure is absent in its associated bore 2. Flud pressure which may continue to pass outwardly through the gladhand seal of the tractor system will prevent ingress of undesired materials until the operator shuts off the compressor on the tractor, whereupon the elements 11 of the seal in the gladhand on the tractor will immediately close to protect the tractor system against such ingress.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

There is claimed:

1. A gladhand seal comprising a generally circumferential piece of flexible material having an axial bore therethrough, and a closure for an end of said bore; said closure comprising a plurality of relatively thin flexible membranes lying in a common plan when at rest, each of said membranes having one of its edges formed integrally with said piece, each said membranes when at rest extending across a portion of said bore and being in cooperative abutment with the remainder of said membranes to close the said end of the bore; at least one rib segment formed integrally with said piece and each of said membranes, each of said rib segments extending inwardly from said piece toward, but terminating short of, the center of said bore, and being disposed medially of the membrane with which it is formed, all of said membranes being movable into and out of the bore subject to fluid flow therethrough in either direction, said ribs acting to bias the membranes to their normal at rest position closing said bore.

2. A gladhand seal as defined in claim 1 wherein each of said membranes defines a segment of a circle and a free inner apex and wherein each rib of each membrane is disposed on a radial line intersecting the free apex of each segment and a point on the circumferential piece.

References Cited by the Examiner

UNITED STATES PATENTS

| 2,335,832 | 11/1943 | Williams | 137—525.1 X |
| 2,670,757 | 3/1954 | Delaney | 137—525.1 X |

FOREIGN PATENTS 608,721  1/1935  Germany.

MARTIN P. SCHWADRON, *Primary Examiner.*

M. CARY NELSON, *Examiner.*